Nov. 19, 1929.  E. F. W. ALEXANDERSON  1,736,689

SPEED CONTROL SYSTEM

Filed March 26, 1928

Inventor:
Ernst F. W. Alexanderson
by Charles E. Tullar
His Attorney

Patented Nov. 19, 1929

1,736,689

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

SPEED-CONTROL SYSTEM

Application filed March 26, 1928. Serial No. 264,715.

My invention relates to apparatus for regulating the speed of alternating current asynchronous motors. More particularly my invention relates to apparatus for obtaining a constant speed of asynchronous motors when operated from a source of variable frequency.

In many instances it is desirable to drive apparatus at a very constant or basic speed and to operate the apparatus from an alternating current distribution system which is subject to slight variations in frequency such that a synchronous motor connected thereto would not operate at the desired constant speed. In other instances, for example in certain television systems where the transmitter and receiver are in different countries it becomes essential to maintain synchronism between the rotating parts of the transmitter and the receiver.

The main object of my invention is to provide apparatus which when energized from the ordinary alternating current distribution system produces a constant speed of rotation such that a number of such drives energized from entirely different systems may be adjusted to operate in synchronism.

In carrying my invention into effect I provide apparatus in which an asynchronous motor is energized through a circuit which is tuned to vary the voltage supplied to the motor with ordinary variations in frequency to the extent necessary to cause the slip of the motor to vary directly with variations in frequency such that the speed remains constant.

Figure 1:
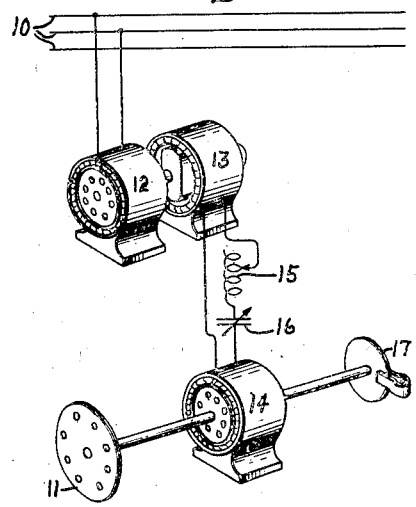
Figure 2:
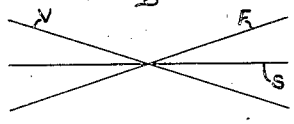
Figure 3:
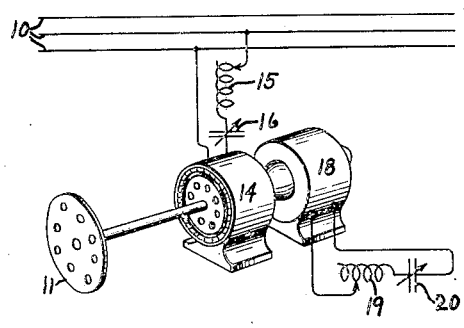

The features of my invention which are believed to be novel and patentable will be pointed out in the claims appended hereto. For a better understanding of my invention reference is made in the following description to the accompanying drawings in which Fig. 1 represents a preferred arrangement of the apparatus for maintaining constant speed; Fig. 2 illustrates by way of curves the relation between the frequency and voltage supplied to the constant speed motor and the slip and speed of the motor over the range of frequency variation for which the apparatus is intended; and Fig. 3 represents a frequency responsive load connected to an induction motor to maintain substantially constant speed of the motor.

In Fig. 1 is represented an ordinary alternating current distribution system at 10 the frequency of which may be assumed to vary slightly. For example if it is a 60 cycle system we may expect the frequency to vary from 59½ cycles to 60½ cycles under ordinary conditions. At 11 is represented a rotary part of a television apparatus the speed of which it is desired to maintain absolutely constant and to utilize the source 10 as the available supply of driving energy. For this purpose I have illustrated a motor generator set consisting of an ordinary induction motor 12 and a synchronous generator 13. The generator 13 supplies a second induction motor 14 which drives the apparatus 11. The motor generator set 12, 13 is preferably provided to obtain an alternating current voltage which is proportional to its frequency and to this end the rotating field magnets of the generator 13 are permanent magnets. I might also use the ordinary direct current excited field here if a constant voltage direct current source is available. With this arrangement the generator 13 will produce a voltage which varies with its frequency.

In the circuit between generator 13 and induction motor 14 is connected an inductance 15 and a condenser 16. These devices are preferably adjustable and the circuit thus formed is tuned to resonance at the lowest frequency of this circuit. For example, if the frequency of generator 13 varies between 53 and 54 cycles this circuit will be tuned to resonance at 53 cycles. As a result of this arrangement the voltage across the terminals of motor 14 will be higher when the frequency is 53 cycles than it is at 54 cycles because of the voltage drop in the circuit when it is not in resonance. In other words, the voltage impressed upon motor 14 varies inversely with the frequency over this range as illustrated in Fig. 2 where curve F represents frequency and curve V represents the voltage impressed upon motor 14.

The slip of an induction motor with a constant load is inversely proportional to the supply voltage so that if we maintain the load on motor 14 constant as for example by means of an eddy current brake represented at 17 the slip of motor 14 will increase as the voltage decreases and as the frequency increases. Thus by properly adjusting the load at 17, for example by moving the magnet thereof toward and away from the center of the rotating disc, the increase in slip with a decrease in voltage may be made such that the actual speed remains constant as the frequency increases. The curve F of Fig. 2 may also represent the slip of the motor and the horizontal line S the speed.

The apparatus is not intended to maintain constant speed for wide variation in frequency but experiments have demonstrated that for the small variations in frequency ordinarily met with on commercial alternating current systems the apparatus may be used to obtain a constant basic speed which is independent of the frequency. The apparatus may likewise be employed to vary the speed of asynchronous motors where the frequency remains constant.

In many cases I may dispense with the motor generator set 12 and 13 and connect the tuned circuit of motor 14 directly or through transformers to the system 10 because it is usual that variations in frequency are accompanied with corresponding variations in voltage. Again, where the frequency variations are more pronounced than usual I may utilize the motor generator set and in addition connect the motor 12 to the system 10 through another tuned circuit similar to that in the circuit of the motor 14 but tuned to the lowest frequency of system 10. The motor generator set will thus operate at a more nearly constant speed and will supply a frequency the variations of which may be sufficiently small as to be nullified by the second tuned circuit and induction motor.

Fig. 3 represents a further embodiment of the invention where the load on the motor 14 is an alternating current generator 18 which supplies a load consisting of a second tuned circuit including an inductance 19 and a condenser 20. In this case it is assumed that the frequency supplied to motor 14 is too great to be entirely nullified by the tuned circuit 15—16 and that the speed of motor 14 tends to vary slightly, in which case the load circuit of generator 18 is tuned to resonance at speeds slightly higher than the normal speed. At the normal speed of motor 14 the load is negligible but increases very rapidly for slight increases in speed of motor 14. This tends to keep the speed substantially constant because a very slight increase in the frequency of generator 18 produced a considerable increase in load on motor 14.

In accordance with the provisions of the patent statutes I have described the principle of operation of my invention, together with the apparatus which I now consider to represent the embodiment thereof; but I desire to have it understood that the apparatus shown and described is only illustrative and that the invention may be carried out by other means.

What I claim as new and desire to secure by Letters Patent of the United States is:

1. A speed control system for asynchronous motors comprising in combination with such a motor an alternating current source subject to frequency variations, and a resonant circuit through which said motor is supplied from said source, said circuit being tuned to modify the voltage supplied to said motor in response to changes in the frequency of said source.

2. A speed control system for asynchronous motors comprising in combination with such a motor an alternating current source subject to frequency variations, and a resonant circuit through which said motor is supplied from said source, said circuit being tuned to vary the voltage supplied to said motor in inverse proportion to variations in the frequency of said source.

3. A speed control system comprising an alternating current source subject to frequency fluctuations, an asynchronous motor, and a resonant circuit connected between said source and motor, said circuit being tuned to resonance at the lower range of frequency fluctuations of said source.

4. A speed control system for an alternating current motor having characteristics which cause its speed to be directly proportional to both the frequency and the voltage variations of the source of supply, and a resonant circuit through which said motor is supplied.

5. In combination with a source of supply which is subject to corresponding voltage and frequency fluctuations, an alternating current motor supplied thereby, said motor having characteristics which cause its speed to vary in direct proportion to both the frequency and magnitude of its terminal supply voltage, and means for controlling the speed of said motor connected between said motor and said source of supply for causing the voltage supplied to the motor terminals to vary inversely with respect to the frequency fluctuations of said source.

6. A speed control system for induction motors comprising, in combination with such a motor, adjustable tuning means connected in series relation with the supply terminals of said motor.

7. A speed control system for induction motors comprising a source of alternating supply subject to frequency variations, an induction motor supplied thereby, and means responsive to the frequency variations of said source for varying the slip of said motor in direct proportion to the frequency variations and tending to make the speed of said motor independent of such frequency variations.

8. A speed control system for asynchronous motors comprising, in combination with such a motor, a tuning circuit through which said motor is supplied and a load device driven by said motor, said tuning circuit and load device being adjustable to regulate the speed of said motor.

9. A speed control system for induction motors comprising, in combination with such a motor, generating means driven by said motor for producing an alternating current having a frequency proportional to the speed of said motor, and a load circuit supplied by said generating means tuned to vary the load current in proportion to the generator frequency.

10. A speed control system for induction motors comprising, in combination with such a motor, a tuned circuit through which said motor is supplied, generating means driven by said motor for producing an alternating current having a frequency proportional to the speed of rotation of said motor, and a second tuned circuit supplied by said generating means.

11. A speed control system for induction motors comprising a source of alternating current supply which is subject to frequency fluctuations, an induction motor, a resonant circuit through which said motor is supplied from said source, said circuit being tuned to resonance at the lower range of frequency fluctuations of said source, generating means driven by said motor for producing an alternating current having a frequency proportional to the speed of rotation of said motor, and a second tuned circuit supplied by said generating means, said last mentioned circuit being tuned to resonance at the upper range of frequency produced by the generating means.

In witness whereof, I have hereunto set my hand this 24th day of March, 1928.

ERNST F. W. ALEXANDERSON.